Patented May 28, 1940

2,202,594

UNITED STATES PATENT OFFICE 2,202,594

PIGMENTS FOR USE IN MANUFACTURE OF ARTIFICIAL SILK

Harry Donald Mudford, Blackley, Manchester, England, assignor, by mesne assignments, to National Lead Company, New York, N. Y., a corporation of New Jersey No Drawing. Original application November 23, 1935, Serial No. 51,272, now Patent No. 2,132,491, dated October 11, 1938. Divided and this application April 19, 1938, Serial No. 202,879. In Great Britain December 28, 1933

20 Claims. (Cl. 134—58)

A. This invention is a division of the application identified as Mudford, Serial No. 51,272, filed November 23, 1935, now Patent No. 2,132,491, granted Oct. 11, 1938. The invention relates to new compositions of matter, being pigments of superior properties having great utility, for instance, in the delustering of rayon. The invention will be described, for purposes of illustration but not for purposes of limitation, by reference to particular examples illustrating both the new process and the new product.

B. Titanium dioxide is a pigment of great value which can be used in coating compositions, in delustering, and in many other technical fields with great success. Nevertheless, it has certain imperfections. For example, regenerated cellulose so delustered, when dyed with a direct dye, is more fugitive to light in the wet state, than the undelustered material, and cellulose esters and ethers when dyed with a direct dye and when so delustered are more fugitive to light in the dry state, than the undelustered material. The materials containing, or treated with, the new pigment are claimed in the application of which this is a division or in other applications.

C. An object of the invention is to prepare a composition of matter of new and useful properties. Another object of the invention is to prepare titanium dioxide of superior quality. Other objects of the invention will be in part apparent and in part hereinafter set forth.

D. The objects of the invention are accomplished, generally speaking, by pretreating the titanium pigment with a compound of chromium or of one of the metals in the chromium group. The process is adapted to modification in itself and with respect to the materials with which it can be used, but in all such variations the above principle should be incorporated. In one process of using my invention titanium dioxide is treated, before use, with a water-soluble chromium compound, for instance, a water-soluble chromium salt. The pigment so prepared may then be applied to a variety of uses with an improved result.

E. In the preferred form of the invention the pigment will be treated with a water-soluble chromium compound, but water-insoluble chromium compounds can also be used. For instance, there can be incorporated with titanium dioxide freshly precipitated chromium hydroxide; or the titanium dioxide can be mixed with a soluble chromium salt in the presence of a reagent that will precipitate chromium hydroxide on the titanium dioxide. Such mixtures may be used dry, or they may be incorporated with delustering solutions in the moist condition. Again, the treatment may be carried out by mixing together finely divided chromium sesquioxide and titanium dioxide.

F. The following examples are illustrative of the invention.

Example I

Titanium dioxide is treated for one hour at 85–95° C. in a 1% solution of potassium or sodium bichromate. Thereupon it is thoroughly washed, and is collected, and dried.

Example II

The treatment of the titanium dioxide is effected by means of a solution of 3 parts of potassium bichromate and 1 part formic acid (80%) in 1,000 parts of water, the procedure being otherwise the same as that of Example I. In place of the potassium bichromate and formic acid there may be used 2 parts of chromic acid.

Example III

The liquor contains 10 parts of chromium chloride or chromium fluoride per litre but otherwise the procedure is as Example I.

G. Titanium dioxide may be treated with water-soluble chromium compounds such as chromium chloride, chromium fluoride, or chromium trioxide, or it may be treated, prior to use, with insoluble chromium compounds, for instance, by mixing a paste thereof thoroughly with freshly precipitated chromium hydroxide. Alternatively, chromium hydroxide may be precipitated in situ by stirring the titanium dioxide paste with a solution of a chromium sesquioxide salt in the presence of ammonia or an alkali carbonate.

H. The advantages of the invention accrue not only to the water-soluble or water-insoluble compounds of chromium but can be obtained by the use of water-soluble or water-insoluble metals in the same periodic group as chromium, namely tungsten, molybdenum, and uranium. Artificial silk from regenerated cellulose or from cellulose esters and ethers, when delustered by means of titanium dioxide are improved in light fastness with direct colors if the delustrant is incorporated in any of the above described methods with a water-soluble or water-insoluble salt of any of these elements.

Example IV

Titanium dioxide is treated for one-half hour at 85° C. in a liquor containing 3 parts sodium tungstate and 1 part formic acid, after which it is well washed with water, filtered, and dried.

Example V

Titanium dioxide is treated with sodium molybdate under the conditions described in Example IV.

Example VI

Titanium dioxide (99 parts) is mixed with sodium tungstate or sodium molybdate (1 part). This mixture may be applied to particular uses without isolation of the pigment. For instance, as illustrated in the application of which this is a division, this mixture may be used for the delustering of rayon.

Example VII 100 parts of titanium dioxide are treated with a solution of 1½ parts chromium chloride at 85° C. and sufficient dilute caustic soda solution (say 5%) gradually added under agitation to precipitate the chromium as chromium hydroxide. The resulting product is collected, washed, dried, and ground.

Example VIII 99 parts of finely divided titanium dioxide are ground with 1 part of finely divided chromium sesquioxide until a homogeneous mixture is obtained.

I. Great modifications and variations may be used in the process without departing from its essence. The above examples have been chosen with the object of presenting the invention in as many of its phases as is consistent with the space which may be allotted to the disclosure of an invention in a patent application. Obviously where so many variables enter not all can be illustrated by specific examples.

J. As many apparently widely different embodiments of this invention may be made without departing from the spirit and scope thereof, it is to be understood that I do not limit myself to the specific embodiments thereof except as defined in the appended claims.

I claim:

1. A method for improving pigment titanium oxide, comprising admixing with said pigment an inorganic compound containing as its sole amphoteric metal constituent an element selected from sub-group A, group VI, of the periodic table.

2. A method for improving pigment titanium oxide, comprising admixing with said pigment, while the same is in aqueous suspension, a water-soluble, inorganic compound containing as its sole amphoteric metal constituent an element selected from sub-group A, group VI, of the periodic table.

3. A method for improving pigment titanium oxide, comprising admixing with said pigment an inorganic chromium compound.

4. A method for improving pigment titanium oxide, comprising admixing with said pigment a water-soluble, inorganic chromium compound.

5. A method for improving pigment titanium oxide, comprising admixing with said pigment an inorganic chromium salt.

6. A method for improving a titanium oxide pigment, comprising admixing sodium bichromate with said pigment.

7. A method for improving a titanium oxide pigment, comprising admixing chromium hydroxide with said pigment.

8. A method for improving pigment titanium oxide, comprising precipitating chromium hydroxide on said pigment while the latter is in aqueous suspension.

9. A titanium oxide pigment intimately associated with an inorganic chromium compound.

10. A titanium oxide pigment intimately associated with an inorganic chromium salt.

11. A titanium oxide pigment intimately associated with sodium bichromate.

12. A titanium oxide pigment intimately associated with chromium hydroxide.

13. A titanium oxide pigment intimately associated with chromium chloride.

14. A titanium oxide pigment containing as an essential ingredient a minor amount of an inorganic compound containing as its sole amphoteric metal constituent an element selected from subgroup A, group VI, of the periodic table.

15. A titanium oxide pigment containing as an essential ingredient a small amount of an added inorganic chromium compound.

16. A titanium oxide pigment containing as an essential ingredient a small amount of added sodium bichromate.

17. A titanium oxide pigment containing as an essential ingredient a small amount of added chromium hydroxide.

18. A titanium oxide pigment containing as an essential ingredient a small amount of added chromium chloride.

19. A process for producing an improved titanium oxide pigment comprising mixing a soluble chromium salt with said pigment and precipitating chromium hydroxide thereon by reacting said salt with an alkaline reagent.

20. A process for producing an improved titanium oxide pigment which comprises mixing substantially 1½ parts of a solution of chromium chloride with substantially 100 parts of the titanium oxide pigment and then adding sufficient dilute caustic soda solution to the resulting mixture to precipitate chromium hydroxide on said pigment.

HARRY DONALD MUDFORD.